US012748687B2

(12) United States Patent
Zhou et al.

(10) Patent No.: US 12,748,687 B2
(45) Date of Patent: Sep. 29, 2026

(54) IN-VEHICLE OPERATING SYSTEM, DEBUGGING SYSTEM AND METHOD, ELECTRONIC DEVICE, AND STORAGE MEDIUM

(71) Applicant: BYD COMPANY LIMITED, Shenzhen (CN)

(72) Inventors: Huan Zhou, Shenzhen (CN); Jinwen Luo, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 252 days.

(21) Appl. No.: 18/606,344

(22) Filed: Mar. 15, 2024

(65) Prior Publication Data

US 2024/0220399 A1 Jul. 4, 2024

Related U.S. Application Data

(63) Continuation of application No. PCT/CN2022/142712, filed on Dec. 28, 2022.

(30) Foreign Application Priority Data

Dec. 30, 2021 (CN) ......................... 202111663812.0

(51) Int. Cl.
*G06F 11/3698* (2025.01)
*B60R 16/023* (2006.01)
*G06F 9/54* (2006.01)

(52) U.S. Cl.
CPC ........ *G06F 11/3698* (2025.01); *B60R 16/023* (2013.01); *G06F 9/546* (2013.01)

(58) Field of Classification Search
CPC ............... G06F 11/362; G06F 11/3692; G06F 11/3698; G06F 9/546; B60R 16/023
See application file for complete search history.

(56) References Cited

U.S. PATENT DOCUMENTS 7,140,015 B1 * 11/2006 Bhanjois ................. G06F 9/546 718/107
7,523,179 B1 * 4/2009 Chu ...................... H04L 69/325 713/1

(Continued)

FOREIGN PATENT DOCUMENTS

CN 102539955 A 7/2012
CN 103049299 A 4/2013

(Continued)

OTHER PUBLICATIONS

Vector, CANoe at a glance, Multibus ECU Networks and Single ECUs Development and Test Tool, May 2021, 9 pages.

(Continued)

*Primary Examiner* — Marina Lee
(74) *Attorney, Agent, or Firm* — Sheppard Mullin Richter & Hampton LLP

(57) ABSTRACT

An in-vehicle operating system includes a hardware layer, a software layer, and an application layer. The hardware layer includes at least one controller, and each of the at least one controller includes a processor. The software layer includes a Be operating system (BEOS) and a BEOS driver, where the BEOS is configured to manage and control the in-vehicle operating system, and the BEOS driver is configured to transfer data between the hardware layer and the software layer. The application layer includes a plurality of applications, the applications are connected to the BEOS by an operating system interface, and each of the applications is configured to provide an in-vehicle application to the vehicle.

20 Claims, 7 Drawing Sheets

(56) References Cited

U.S. PATENT DOCUMENTS

| | | | | |
|---|---|---|---|---|
| 11,814,086 | B1 * | 11/2023 | Bharwani | G06F 9/546 |
| 2008/0201453 | A1 | 8/2008 | Assenmacher | |
| 2009/0240377 | A1 * | 9/2009 | Batzler | G05B 23/0216 340/584 |
| 2015/0074128 | A1 * | 3/2015 | Osterman | G06F 16/14 707/755 |
| 2017/0277654 | A1 * | 9/2017 | Wang | G06F 15/177 |
| 2020/0290530 | A1 * | 9/2020 | Im | G06F 9/445 |
| 2021/0268973 | A1 * | 9/2021 | Nakaya | B60R 16/0231 |
| 2024/0217459 | A1 * | 7/2024 | Zhou | B60R 16/0231 |

FOREIGN PATENT DOCUMENTS

| | | | |
|---|---|---|---|
| CN | 103365236 | A | 10/2013 |
| CN | 108573153 | A | 9/2018 |
| CN | 112737893 | A | 4/2021 |
| CN | 113821247 | A | 12/2021 |
| JP | 2009080566 | A | 4/2009 |
| JP | 2014526727 | A | 10/2014 |
| WO | 2013036248 | A1 | 3/2013 |

OTHER PUBLICATIONS

Nico Adler, VECTOR, PREEvision, Technical Article, Model-Based E/E Development Confirming to ISO 26262, Nov. 2018, 5 pages.

International Search Report and Written Opinion for Application No. PCT/CN2022/142712, mailed on Mar. 15, 2023, 13 pages.

51fusa “know e-platform 3.0, and see the product strategy of BYD”, BAIDU [online] Sep. 18, 2021, retrieved from URL: https://www.51fusa.com/client/information/informationdetail/id/2060.html, 9 pages.

* cited by examiner

IN-VEHICLE OPERATING SYSTEM, DEBUGGING SYSTEM AND METHOD, ELECTRONIC DEVICE, AND STORAGE MEDIUM

CROSS-REFERENCE TO RELATED APPLICATIONS

The application is a continuation application of International Patent Application No. PCT/CN2022/142712 filed on Dec. 28, 2022, which is based on and claims priority to and benefits of Chinese Patent Application No. 202111663812.0, filed on Dec. 30, 2021. The entire content of all of the above-referenced applications is incorporated herein by reference.

FIELD

The present disclosure usually relates to the field of in-vehicle technologies, and in particular, to an in-vehicle operating system, a debugging system and method, an electronic device, and a storage medium.

BACKGROUND

The framework designs of the existing in-vehicle operating systems are general and not diversified. For example, a lot of in-vehicle software all uses a microcontroller as a controller. Although use of the basic microcontroller programming mode can reduce costs, such a development mode has major disadvantages. First, the maintainability of code is poor. Second, the program is not easy to be extended. Finally, the portability of a project is poor. In addition, more attention is paid to the intellectual property rights globally. It is likely that one day in the future, currently free software may no longer be free, which may indirectly increase usage costs and increase costs of vehicle enterprises.

SUMMARY

An in-vehicle operating system, a debugging system and method, an electronic device, and a storage medium are provided. Use of a self-developed built-in Be operating system (BEOS) enables the in-vehicle operating system provided by the embodiments of the present disclosure to have better real-time performance and stability, as well as stronger safety. In addition, the in-vehicle operating system is equipped with a corresponding BEOS debugging system, so that the better development, authentication, debugging, maintenance, and the like can be performed on in-vehicle software on the self-developed in-vehicle operating system.

According to a first aspect, an in-vehicle operating system is provided in the present disclosure, including a hardware layer, a software layer, and an application layer.

The hardware layer includes at least one controller, and each of the at least one controller includes a processor.

The software layer includes a BEOS and a BEOS driver. The BEOS is configured to manage and control the in-vehicle operating system, and the BEOS driver is configured to transfer data between the hardware layer and the software layer.

The application layer includes multiple applications, the multiple applications are connected to the BEOS by an operating system interface, and each of the applications is configured to provide an in-vehicle application to the vehicle.

For the in-vehicle operating system according to the embodiments of the present disclosure, use of a self-developed built-in BEOS enables the in-vehicle operating system provided by the embodiments of the present disclosure to have better real-time performance and stability, as well as stronger safety.

According to a second aspect, the present disclosure provides a BEOS debugging system. The BEOS debugging system runs on a personal computer (PC) end, and is applied to the in-vehicle operating system of the first aspect.

For the BEOS debugging system according to this embodiment of the present disclosure, the in-vehicle operating system is equipped with a corresponding BEOS debugging system, so that the in-vehicle software of the in-vehicle operating system may be self developed for better development, authentication, debugging, maintenance, and the like.

According to a third aspect, the present disclosure provides a BEOS debugging method, including the following steps.

A BEOS debugging system sends a debugging instruction to an in-vehicle operating system.

The in-vehicle operating system performs debugging on a to-be-debugged object according to the debugging instruction.

The to-be-debugged object runs according to the debugging instruction, generates a running result of the to-be-debugged object, and the running result is fed back to the BEOS debugging system.

The BEOS debugging system determines performance of the to-be-debugged object according to the running result of the to-be-debugged object.

For the BEOS debugging method according to the embodiments of the present disclosure, a developer may check logic of a program through the BEOS debugging system, print out a state of a vehicle window program and the like to check, and perform corresponding adjustment and tests.

According to a fourth aspect, the present disclosure provides an electronic device. The electronic device includes a processor and a memory. The memory has at least one instruction, at least one program, a code set, or an instruction set stored therein. The at least one instruction, the at least one program, the code set, or the instruction set is loaded and executed by the processor to implement the steps of the BEOS debugging method and the steps of the task synchronization, communication, and driving methods in the in-vehicle operating system according to the embodiments of the present disclosure.

According to a fifth aspect, the present disclosure provides a non-transitory computer-readable storage medium. The non-transitory computer-readable storage medium has one or more programs stored therein. The one or more programs are executable by one or more processors to implement the steps of the BEOS debugging method and the steps of the task synchronization, communication, and driving methods in the in-vehicle operating system according to the embodiments of the present disclosure.

BRIEF DESCRIPTION OF THE DRAWINGS

Additional aspects and advantages of the present disclosure become more apparent by reading the detailed descriptions of non-limiting embodiments provided with reference to the following accompanying drawings.

DETAILED DESCRIPTION

The present disclosure is described below in detail with reference to the accompanying drawings and embodiments. It may be understood that embodiments described herein are used to explain a related invention, but not to limit the invention. In addition, it should also be noted that, for ease of description, the accompanying drawings show parts relevant to the invention rather than the entire structure.

It should be noted that the embodiments in the present disclosure and features in the embodiments may be mutually combined in a case that no conflict occurs. The present disclosure is described below in detail with reference to the accompanying drawings and the embodiments.

An existing in-vehicle operating system includes a user space and a kernel space. The user space includes an application module, a whitelist management module, a configuration management module, and an audit log generation generate module. The kernel space includes a system call layer, an autonomous access control module, a mandatory access control module, a trusted measurement module, an application loading module, and a policy cache management module. The whitelist management module is connected to the application module and the configuration management module. The trusted measurement module is configured to perform trusted measurement on an application file to enable the kernel space to determine whether an application can continue to be loaded. The existing in-vehicle operating system includes two parts, namely, the user space and the kernel space. The in-vehicle system has a general and undiversified framework design, has no supporting debugging system related to in-vehicle development, and is not applied to an actual vehicle. Moreover, use of the basic microcontroller programming mode has a lot of disadvantages such as poor maintainability of code, poor extendability of a program, and poor portability of a project.

Figure 1:
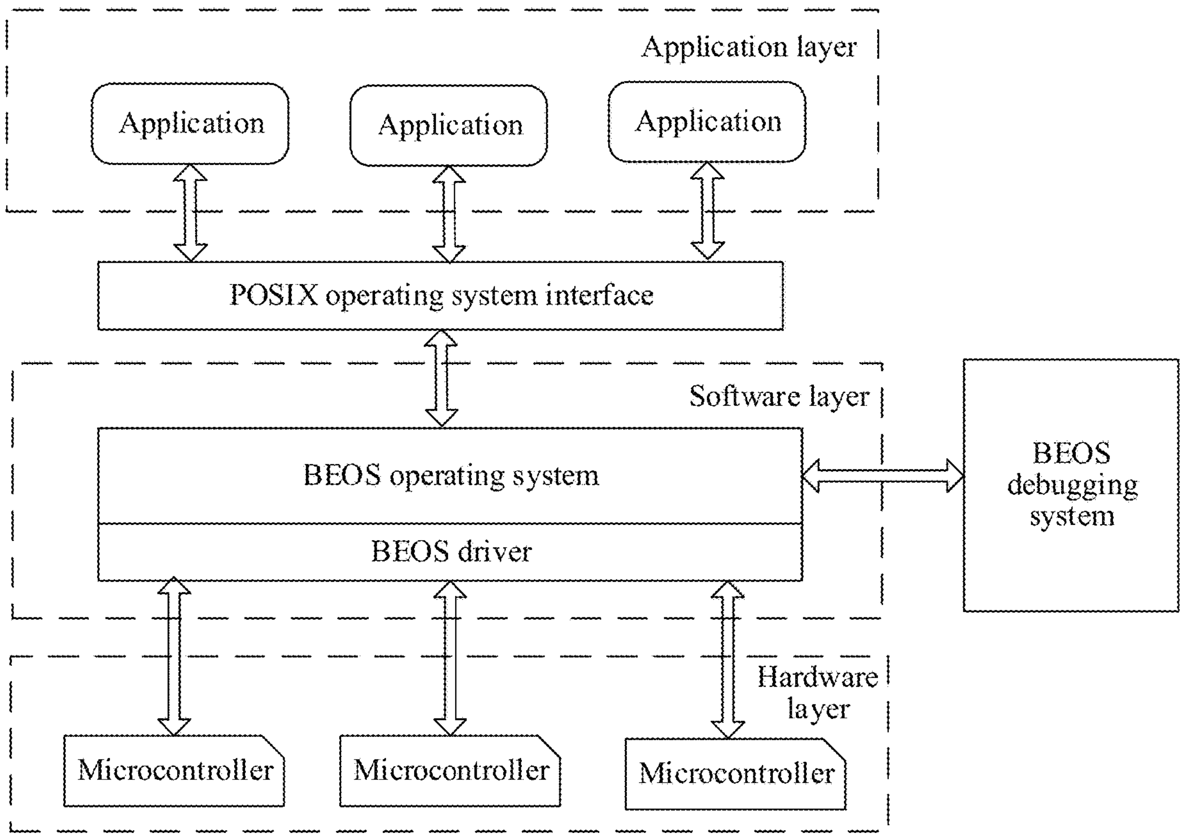
FIG. 1 is an architectural diagram of a combination of an in-vehicle operating system and a BEOS debugging system according to an embodiment of the present disclosure.

FIG. 1 shows a structural diagram of an in-vehicle operating system according to an embodiment of the present disclosure.

As shown in FIG. 1, in this embodiment, the in-vehicle operating system provided in the present disclosure includes a hardware layer, a software layer, and an application layer sequentially arranged from bottom to top.

The hardware layer includes at least one piece of controller hardware (e.g., the controller). Each controller includes a processor.

The software layer includes a BEOS and a BEOS driver. The BEOS is configured to manage and control hardware and software resources of a computer system, and the BEOS driver is configured to implement data transmission between the hardware layer and the software layer.

The application layer includes multiple applications, the multiple applications are connected to the BEOS by an operating system interface, and each application is configured to provide an in-vehicle-related application.

In an embodiment, the hardware layer is configured to provide in-vehicle-related hardware. The hardware layer includes at least one piece of controller hardware, for example, a microcontroller. Each piece of controller hardware includes a processor. Multiple applications are communicatively connected to a Be operating system (BEOS) by a portable operating system interface (POSIX). The POSIX standard defines an interface standard that should be provided by an operating system for an application, and is a general term of a series of application programming interface (API) standards defined by the Institute of Electrical and Electronic Engineers (IEEE) for software to be run on various Uniplexed Information and Computing System (UNIX) operating systems. To overcome the shortcomings of the basic microcontroller programming mode in the existing in-vehicle system, the in-vehicle operating system provided in this embodiment uses a combination of a self-developed built-in BEOS and a microcontroller. The BEOS is running on hardware such as multiple microcontrollers. The microcontroller is configured for development of the in-vehicle software. The BEOS is a computer program configured to manage and control hardware and software resources of a computer system, and is also a kernel and cornerstone of the computer system. The BEOS can handle tasks such as managing and configuring a memory, determining priorities of system resource supply and demand, controlling input and output devices, operating a network, and managing a file system. In addition, the BEOS can provide an operation interface for a user to interact with the system. The BEOS has better code maintainability, better program extendability, better project portability, and low costs.

It should be noted that the BEOS provided in this embodiment of the present disclosure can be fully graphical, has a good system stability and high operating efficiency, can support a 64-bit file system and multiple processors, and integrates multimedia software. The BEOS allows simultaneous operations on multiple pieces of audio, videos, images, and network-based application software. In addition, the memory and the processor are always maintained in the most stable operating state without changing the quality of the multimedia. In addition, the BEOS has complete network functions and comprehensive network software.

Figure 2:
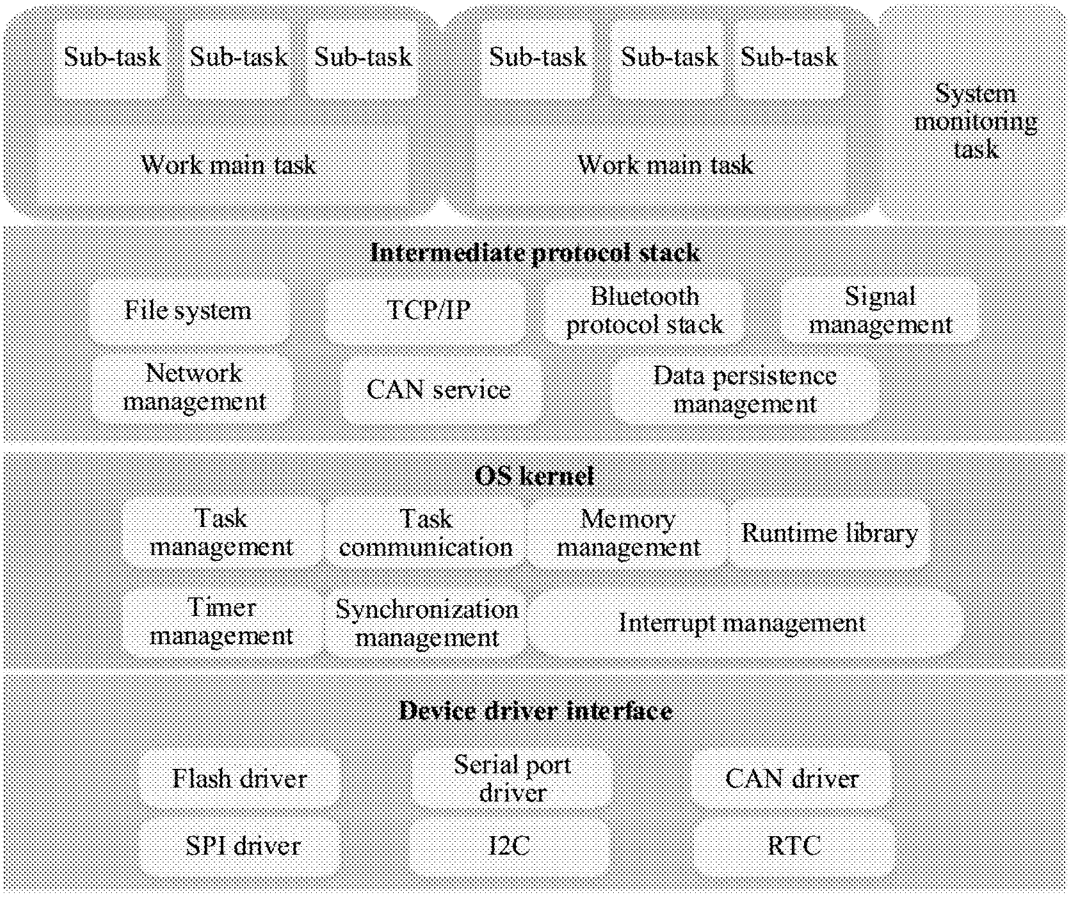
FIG. 2 is an architectural diagram of a combination of a BEOS and a corresponding BEOS driver according to an embodiment of the present disclosure.

Referring to a static framework diagram of an in-vehicle operating system shown in FIG. 2, in this embodiment of the present disclosure, the BEOS includes a task layer, an intermediate protocol stack layer, and an operating system kernel (OS kernel) layer sequentially arranged from top to bottom.

In an embodiment, referring to FIG. 2, the task layer includes a work task module and a system monitoring task module. The work task module includes at least one main task unit. Each main task unit is communicatively connected to at least one sub-task unit.

The intermediate protocol stack layer further includes at least one of the following: a file system module, a TCP/IP protocol module, a Bluetooth protocol stack module, a signal management module, a network management module, a CAN service module, and a data persistence management module.

The OS kernel layer includes at least one of the following: a task management module, a task communication module, a memory management module, a memory runtime library module, a timer management module, a synchronization management module, and an interrupt management module.

In an embodiment, the intermediate protocol stack layer is configured to provide various services in the in-vehicle operating system. Modules are configured to correspondingly provide a file system, the Transmission Control Protocol/Internet Protocol (TCP/IP) protocol, a Bluetooth protocol stack, signal management, network management, a controller area network (CAN) service, data persistence management, and the like. The file system is a method and data structure used by the operating system for clarifying files in a disk or a partition, that is, a method for organizing files in a disk, also refers to a disk or a partition used to store files or to a file system type. A software organization responsible for managing and storing file information in the operating system is referred to as a file management system, or a file system for short. The TCP/IP refers to a protocol suite capable of transmitting information between multiple different networks and includes the IP protocol at the network layer and the TCP protocol at the transport layer. An objective of the Bluetooth protocol specification is to allow applications that comply with the specification to perform operations on each other. The CAN service management is responsible for implementing a network management service and coordinating switching between wake-up and sleep states of a CAN network.

The network management module includes four modules: a communication manager (ComM), a general network manager interface, a bus-related network manager, and a bus-related state manager. During development of an automotive electronic control unit (ECU), the network management module aims to reduce power consumption. Under circumstances, various communication buses choose, according to functions, to sleep or work normally. Communication between ECUs is implemented under a function by distinguishing different communication bus structures. Moreover, an ECU that does not need to participate in the function can enter the sleep state, to reduce energy loss. The network management module coordinates sleep, wake-up, and the like of the entire vehicle.

Figure 3:
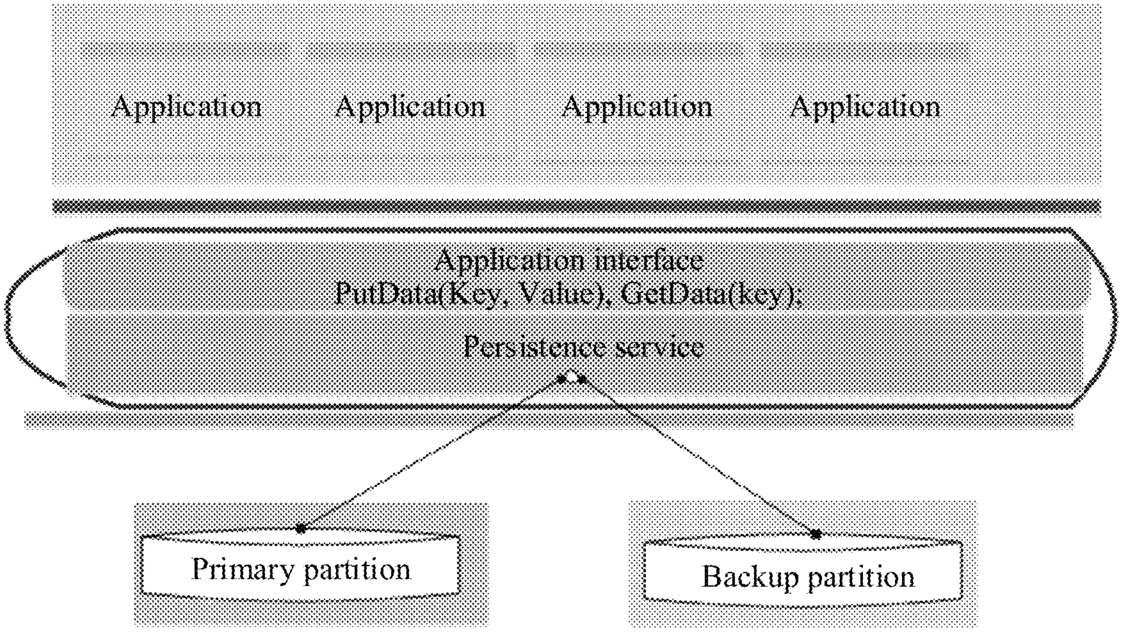
FIG. 3 is a structural diagram of a data persistence management module according to an embodiment of the present disclosure.

During development of domain controller applications and services, the services and the applications all have a requirement for permanent storage of data. The data persistence management may simplify programming by the services and the applications for data storage, and provide a unified data storage API for the services and the applications. The data persistence management, as shown in FIG. 3, includes the following functions. 1) API interface: API interfaces of a KEY-VALUE type and a file type are implemented, including a write interface and a read interface. 2) Data verification and master-slave backup: A system development and design engineer writes a master-slave backup path into a configuration file (in the XML format) through a configuration tool. The data persistent storage management is responsible for storing to-be-written data of an application or a service together with a check code (data of the KEY-VALUE type) into a master-slave backup area. 3) Data verification and recovery: When an application or a service reads KEY-VALUE data through a read interface, the data persistent storage management reads the data and a corresponding verification code together, and performs verification on the data. If the verification fails, data in the backup area needs to be read for recovery after the verification. If verification on the data in the backup area also fails, an error code is returned to a caller. 4) Application data isolation: Data of services and applications is stored separately. An application or a service is stored into a file of a KEY-VALUE type according to an application name or a service name.

Figure 5:
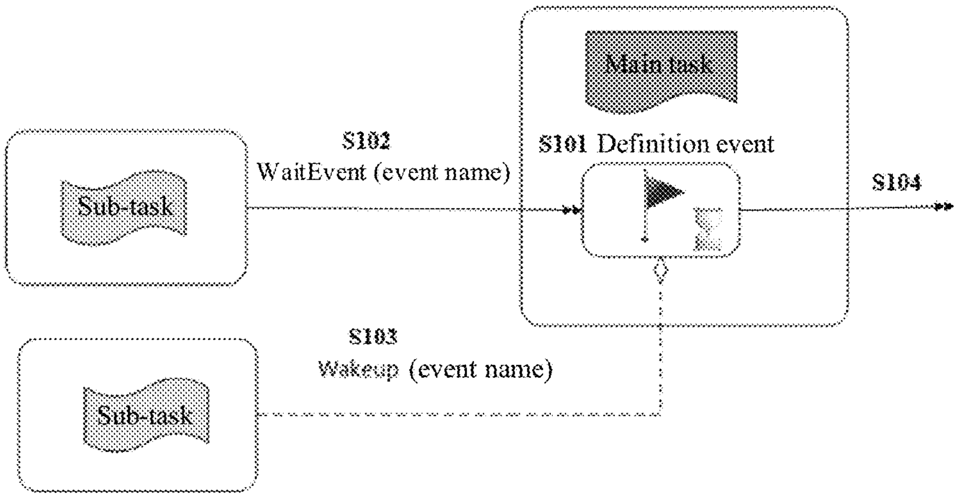
FIG. 5 is a diagram of task synchronization of an in-vehicle operating system according to an embodiment of the present disclosure.

Modules in the OS kernel (Kernel) layer are configured to provide task management, an inter-task communication mechanism, memory management and a runtime library, timer management, synchronization management, interrupt management, and the like. The task management is mainly responsible for creating/deleting a user task and scheduling. The inter-task communication is responsible for synchronization between tasks and data transfer between tasks. For example, multiple sub-tasks may send different messages to a message queue of a sub-task, or a sub-task may send different messages to different message queues of different sub-tasks. The memory management is responsible for allocation and recycling management on a built-in memory. The timer management is responsible for executing a user-defined function within a time specified by a user. The timer service provides software timers for an application and basic software. The synchronization management means that, there may be an assisting relationship between several sub-tasks in one task. That is, a sub-task needs to wait until some event of another sub-task is completed before it can be continued, which involves the problem of synchronization between sub-tasks. Details are shown in FIG. 5. The interrupt management is responsible for setting a user interrupt function. When the hardware is interrupted, an interrupt function set by a user can be executed immediately, or when exceptions occur on hardware, the exceptions can be handled correctly. The system monitoring task unit in the task layer is configured to perform real-time monitoring on the computer system.

In an embodiment, the main task unit is configured to provide centralized resource management and sub-task unit management.

The centralized resource management includes at least one of the following content: a timer, a message queue, a semaphore, a waiting list, and the application and release of a hardware resource.

The sub-task unit management includes at least one of the following content: sub-task creation, sub-task deletion, sub-task state control, and sub-task state monitoring.

Figure 4:
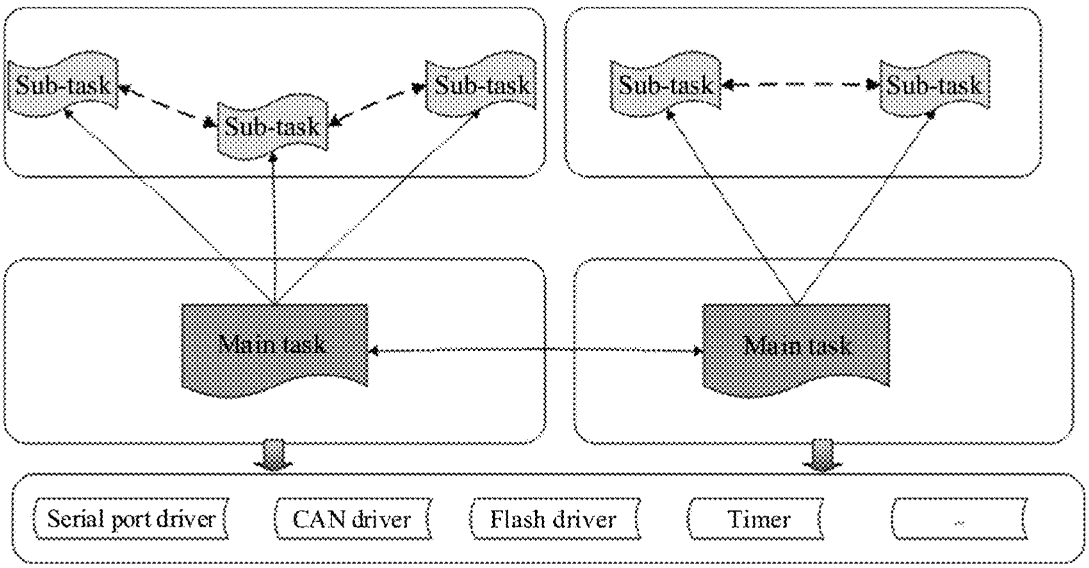
FIG. 4 is a task framework diagram of an in-vehicle operating system according to an embodiment of the present disclosure.

Refer to a task framework diagram of an in-vehicle operating system shown in FIG. 4.

Each project task of the in-vehicle operating system of the present disclosure may be defined as a main task and several sub-tasks. Functions of the main task are centralized resource management and sub-task management. The main task may determine an order of sub-task creation/deletion and a mutual exclusion relationship. The centralized resource management includes a timer, a message queue, a semaphore, a waiting list, and application and release of a related resource such as hardware. The sub-task unit management mainly includes: sub-task creation/deletion, sub-task state control, and sub-task state monitoring and checking.

Refer to a diagram of task synchronization of an in-vehicle operating system shown in FIG. 5.

In one task, there may be an assisting relationship between several sub-tasks. That is, a sub-task needs to wait until another sub-task completes some event before it can be continued, which involves the problem of synchronization between sub-tasks.

For example, an information station includes two sub-tasks. A sub-task is a sub-task of sending a command of a module such as a 3G/4G/5G module, and the other sub-task is a data receiving sub-task. After a sending sub-task sends a command to a device (referring to a timer, a task manager, memory management, or the like in the OS kernel of the BEOS), it is necessary to wait for a serial port data receiving sub-task to return a command execution result state before the execution can be continued.

In an embodiment, a task synchronization method of the in-vehicle operating system of the present disclosure includes the following steps:

S101: A synchronization event is defined.

S102: After a command sending sub-task sends a command, the event is completed through a serial port data receiving sub-task such as WaitEvent.

S103: After receiving and parsing serial port data, the serial port data receiving sub-task completes the event and activates, through Wakeup, a task that is waiting for the event.

S104: Running of the two sub-tasks is continued.

Figure 6:
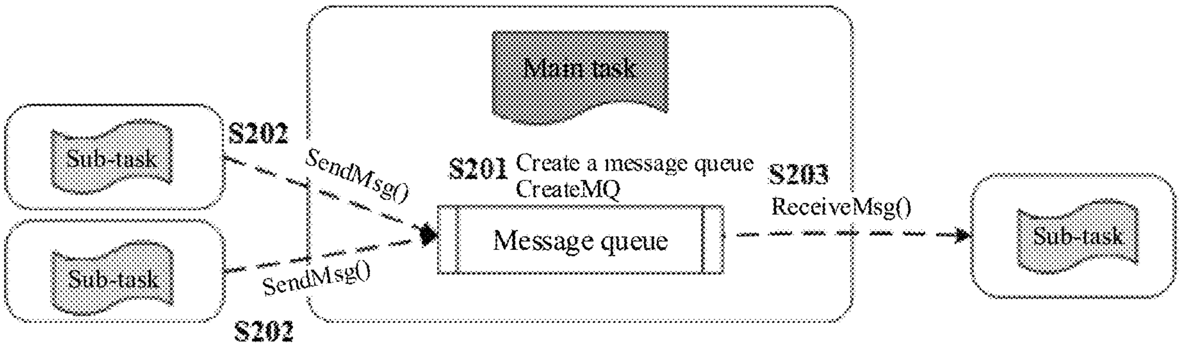
FIG. 6 is a diagram of task communication of a first implementation of an in-vehicle operating system according to an embodiment of the present disclosure.

Refer to a diagram of task communication of a first implementation of an in-vehicle operating system shown in FIG. 6.

When needing to transmit data to another sub-task, a sub-task may perform the transmission through a message queue, for example, multiple sub-tasks may send different message queues to a message queue of a sub-task, which includes following sub-steps.

S201: A main task creates, through CreateMQ( ), a message queue for a sub-task to use.

S202: Multiple sub-tasks that are to send a message transmit message data into the message queue respectively through SendMsg( ) provided by an underlying OS kernel.

S203: A sub-task that is to receive a message receives the message data from the message queue through Receive Msg( ).

Figure 7:
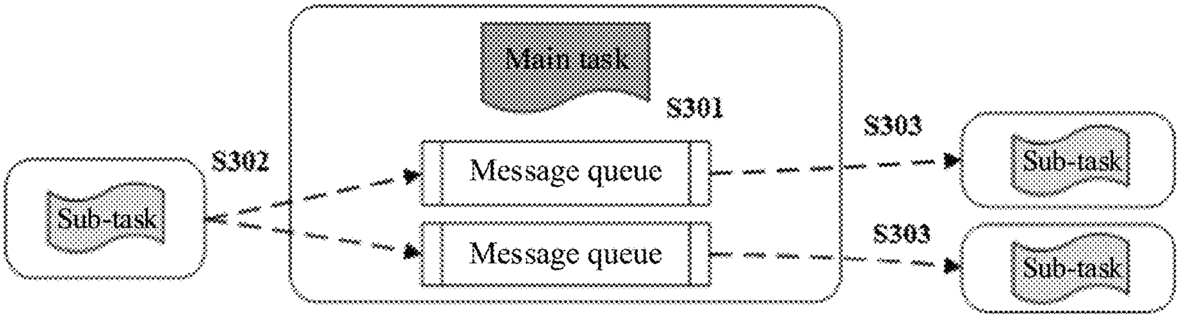
FIG. 7 is a diagram of task communication of a second implementation of an in-vehicle operating system according to an embodiment of the present disclosure.

For example, referring to a diagram of task communication of a second implementation of an in-vehicle operating system shown in FIG. 7, a sub-task sends different message queues to message queues of different sub-tasks, which includes the following sub-steps.

S301: A main task creates, through CreateMQ( ), multiple message queues for a sub-task to use.

S302: A sub-task that is to send a message transmits message data into the multiple message queues through SendMsg( ) provided by an underlying OS kernel.

S303: Multiple sub-tasks that are to receive a message receive the message data from each corresponding message queue through ReceiveMsg( ).

To ensure the accuracy of message data and maximized utilization of resources, a sub-task designed in the in-vehicle operating system of the present disclosure processes a message through the following method: querying the message queue regularly to check whether a message arrives, and if there is a message in the message queue, retrieving the message from the message queue, processing the message according to a protocol defined by each application, and then, proceeding; and if there is no message in the message queue, the sub-task sleeps and waits until a message arrives at another task, and the sub-task is awakened to process the message.

In one embodiment, the BEOS driver includes at least one of the following drivers: a serial port driver, a CAN driver, a serial peripheral interface (SPI) driver, a Flash driver, an inter-integrated circuit (I2C) driver, and a real-time clock (RTC) driver.

Figure 8:
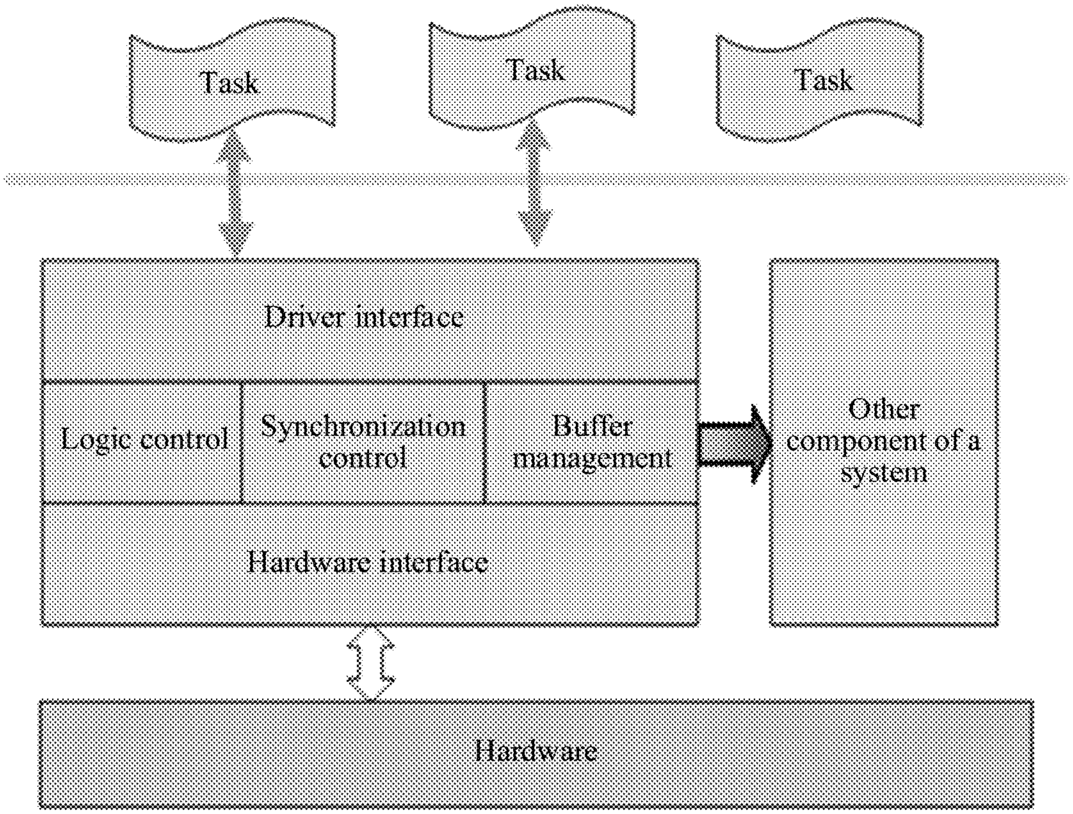
FIG. 8 is a diagram of a BEOS driver of an in-vehicle operating system according to an embodiment of the present disclosure.

In an embodiment, referring to a static framework diagram of an in-vehicle operating system shown in FIG. 2, the BEOS driver in FIG. 1 corresponds to a device driver interface in FIG. 2. The BEOS driver includes a serial port driver, a CAN driver, an SPI driver, a Flash EEPROM (Flash) driver, an I2C driver, and an RTC driver. Referring to the diagram of a driver of an in-vehicle operating system shown in FIG. 8, each driver in the BEOS driver includes four parts: 1) Driver interface: A task implements data exchange with hardware through a driver interface. For different hardware, the driver interface remains unchanged. 2) Intermediate logic layer: a) Logic control is to process protocol/standard related content, for example, CAN classification processing and data verification. b) Synchronization control is to perform synchronization control when multiple tasks access hardware simultaneously. c) Buffer management is to perform buffer management on data generated by a device to prevent data overflow. 3) Hardware interface is that a driver implements an operation on hardware through a hardware interface. The hardware interface is related to a platform. 4) Driver and other component: for example, a timer, synchronization and communication.

Figure 9:
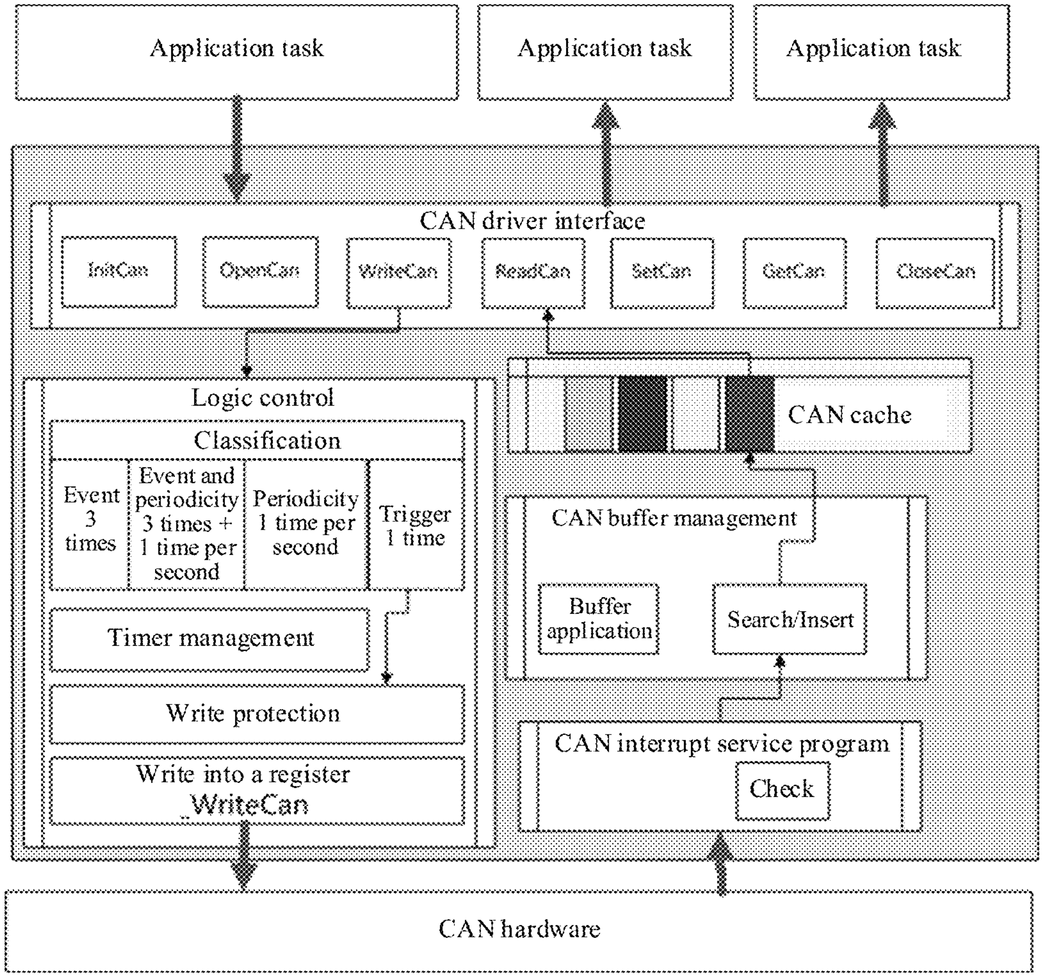
FIG. 9 is a diagram of a controller area network (CAN) driver according to an embodiment of the present disclosure.

Using a CAN driver as an example, CAN is an abbreviation for the controller local area network, which was developed by the German BOSCH company, which is famous for its research and development and production of automotive electronic products, and eventually became an international standard (ISO 11898), and is one of the most widely applied field buses in the world. Referring to FIG. 9, which is a diagram of a CAN driver of an in-vehicle operating system, the CAN driver is a shared device, and the driver is designed such that multiple tasks can read and write the CAN device simultaneously. The prerequisite conditions are as follows: InitCano is called when a platform is initialized, to initialize CAN hardware. A CAN interrupt service program is registered with. A data sending timer is created.

OpenCan (Can Id), WriteCan (CanHandle, Type, Data, Len), ReadCan (CanHandle, Data, Len), CloseCan (CanHandle), and SetCan (CanHandle, Type, Data) are performed through the CAN driver interface. A size of a buffer is set, CAN data sending and the like are canceled, and GetCan (CanHandle, Type, Data) and ResetCan (CanHandle) are performed.

Read and write logic control is to perform ReadCan and WriteCan.

Hardware interface is to perform_WriteCan and a CAN interrupt service program.

For example, an application task performs data transmission with a CAN driver interface. WriteCan in the CAN driver interface first performs classification through logic control, for example, 3 times for the event, 3 times+1 time every 2 seconds for the event and periodicity, 1 time per second for the periodicity, and 1 time for the trigger. Write protection is performed through timer management. Write into a register, transmission to CAN hardware, and transmission to a CAN interrupt service program are performed.

Data is searched/inserted into a CAN cache through a CAN buffer management application. Finally, ReadCan is performed.

The in-vehicle operating system in the related art is merely an interface between a user and vehicle hardware, and is also an interface between the vehicle hardware and upper-layer software. The in-vehicle operating system provided in the present disclosure is divided into three layers: a hardware layer, a software layer, and an application layer. The three-layer design makes it more convenient to maintain and develop in-vehicle application software. The three layers performs their own duties, making the in-vehicle operating system have better real-time performance and stability, as well as stronger safety. For the in-vehicle operating system provided in the present disclosure, an implementation method and an implementation process are described in more detail, and the in-vehicle operating system has already been actually applied to vehicles.

Referring to FIG. 1, according to another aspect of the present disclosure, a BEOS debugging system is provided. The BEOS debugging system is running on a PC end to perform development, authentication, debugging, and maintenance on the in-vehicle operating system.

In an embodiment, this embodiment of the present disclosure provides an in-vehicle operating system supported by a corresponding BEOS debugging system. During development of in-vehicle software on an in-vehicle operating system, more effective development, authentication, debugging, maintenance, and the like are performed through the BEOS debugging system, so that the in-vehicle software can be developed and debugged better on a self-developed in-vehicle operating system. The in-vehicle operating system provided in this embodiment of the present disclosure may be directly applied to a vehicle, or may be open to a third party such as an individual, a department, or a manufacturer. The third party develops in-vehicle-related software on the in-vehicle operating system.

Figure 10:
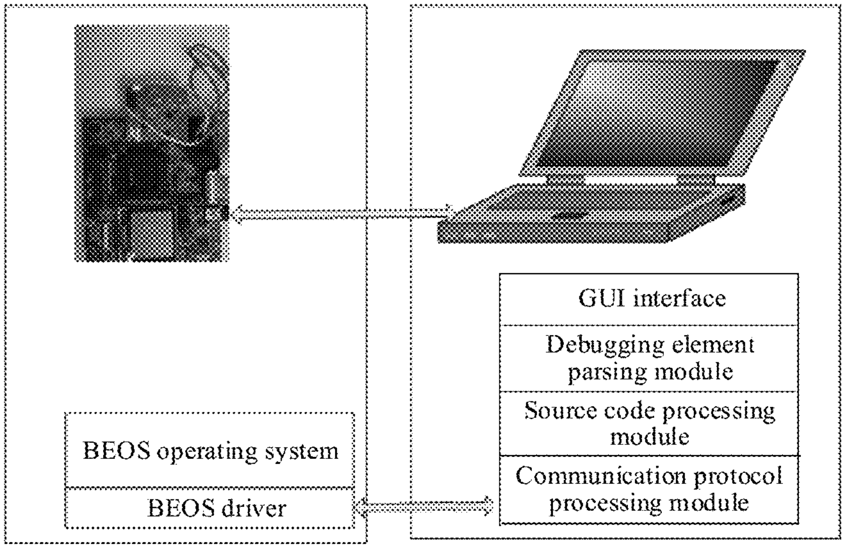
FIG. 10 is a diagram of a debugging tool of a BEOS debugging system configured to debug an in-vehicle operating system according to an embodiment of the present disclosure.

Refer to a diagram of a tool of a BEOS debugging system for debugging an in-vehicle operating system shown in FIG. 10.

The BEOS debugging system is running on a PC end and is divided into four function modules, namely, a communication protocol processing module, a source code processing module, a debugging element parsing module, and a user operation interface module.

The communication protocol processing module is configured to provide communication data process for the BEOS debugging system on the PC end and a BEOS of a microcontroller.

The source code processing module is configured to provide functions such as source code data structure analysis, source code display, and source code positioning. Source code data structure analysis is for analyzing data structures of the code. Source code display is for displaying source code of written code. Source code positioning is for positioning a definition location of a function, a variable, a structure, a parameter, or the like that needs to be found.

The debugging element parsing module is configured to provide a function of displaying a to-be-debugged variable, for example, register display, global variable display, local variable display, stack information display, and function call sequence display, which can enable a developer to learn of a running state of a program, a state of a hardware driver, and a running state of software in real time, so that adjustment and modification can be made in time once an error occurs.

The user operation interface module (e.g., a graphical user interface (GUI)) is configured to provide a user operation interface. The user operation interface is an intermediary for interaction and communication between a user and hardware and software. Through the user operation interface, the user issues an instruction for implementing a function to the software. The software uses the hardware and other software to execute the instruction, and returns an execution result to the user in a text or graphic form.

A source code compilation function of the in-vehicle operating system of the present disclosure includes three parts: source code compilation, a compilation information window, and error definition.

For programming of the in-vehicle operating system software of the present disclosure, a programming tool may be called to program source code, or an official release version may be programmed based on source code for a programming upgrade and the like.

Debugging of the in-vehicle operating system of the present disclosure includes four parts: a register, a local variable, a global variable, and a task state, which is convenient for a program developer to develop an in-vehicle application.

An application range of an in-vehicle operating system application provided in the present disclosure not limited to automotive application development. The in-vehicle operating system application provided in the present disclosure may also be applied to autonomous driving, unmanned aerial vehicle development, and related application software development of aircrafts, ships, and the like in the future.

According to another aspect, an embodiment of the present disclosure provides a BEOS debugging method, including the following steps.

A BEOS debugging system sends a debugging instruction to an in-vehicle operating system.

The in-vehicle operating system performs debugging on a to-be-debugged object according to the debugging instruction.

The to-be-debugged object is running according to the debugging instruction, and a running result is fed back to the BEOS debugging system.

The BEOS debugging system determines performance of the to-be-debugged object according to the running result of the to-be-debugged object.

For example, after a controller is installed on a vehicle, if the controller does not run according to a designed mode, for example, when a step of a vehicle window is wrong, the vehicle window that is originally designed to rise fully, may rises half A developer may check logic of a program through the BEOS debugging system, print out a state of a vehicle window program and the like to check, and perform corresponding adjustment and tests.

Figure 11:
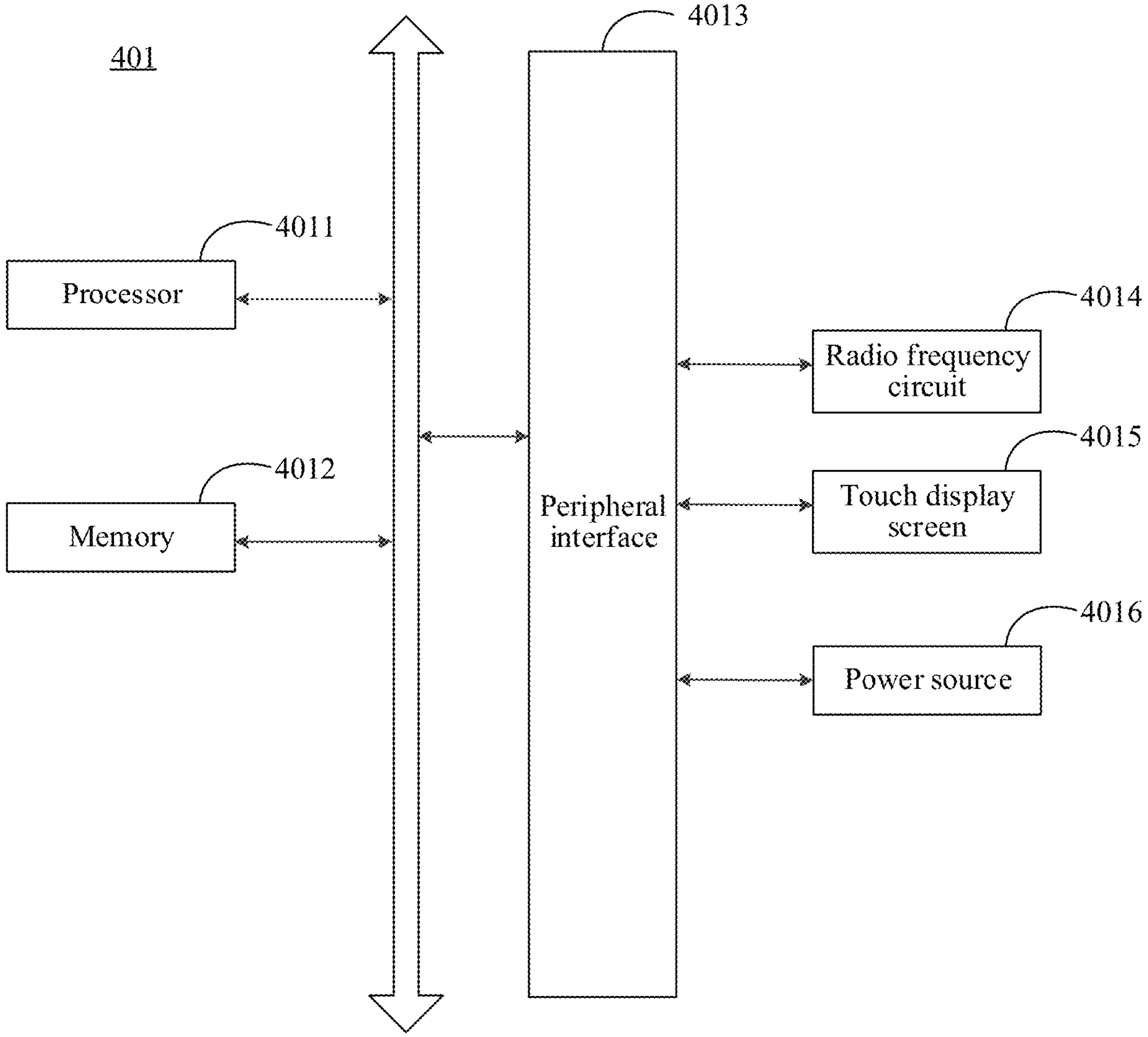
FIG. 11 is a structural block diagram of an electronic device according to an embodiment of the present disclosure.

Based on the foregoing embodiments, referring to FIG. 11, which is a structural block diagram of an electronic device according to an embodiment of the present disclosure, the electronic device 401 includes a processor 4011 and a memory 4012. The processor 4011 may include one or more processing cores, and may be, for example, a 4-core processor or an 8-core processor. The processor 4011 may be implemented by using at least one hardware form of a digital signal processor (DSP), a field-programmable gate array (FPGA), and a programmable logic array (PLA).

The processor 4011 may also include a main processor and a coprocessor. The main processor is configured to process data in an active state, also referred to as a central processing unit (CPU). The coprocessor is a low-power processor configured to process data in a standby state.

In addition, the processor 4011 may be integrated with a graphics processing unit (GPU). The GPU is configured to render and draw content that needs to be displayed on a display screen. In some embodiments, the processor 4011 may further include an artificial intelligence (AI) processor. The AI processor is configured to process a computing operation related to machine learning.

The memory 4012 may include one or more computer-readable storage media that may be non-transitory. The memory 4012 may further include a high-speed random access memory and a non-transitory memory, for example, one or more disk storage devices or flash storage electronic devices. In some embodiments, the non-transitory computer-readable storage medium in the memory 4012 is configured to store at least one instruction, and the at least one instruction being configured to be executed by the processor 4011 to implement the debugging method provided in the method embodiments of the present disclosure.

In some embodiments, the electronic device 401 may further include an electronic peripheral interface 4013 and at least one electronic peripheral. The processor 4011, the memory 4012, and the electronic peripheral interface 4013 may be connected by using a bus or a signal cable. Each electronic peripheral may be connected to the electronic peripheral interface 4013 by using a bus, a signal cable, or a circuit board.

In an embodiment, the electronic peripheral includes, but is not limited to, a radio frequency (RF) circuit 4014, a touch display screen 4015, and a power source 4016. The electronic peripheral interface 4013 may be configured to connect at least one electronic peripheral related to input/output (I/O) to the processor 4011 and the memory 4012. In some embodiments, the processor 4011, the memory 4012, and the electronic peripheral interface 4013 are integrated on the same chip or the same circuit board. In some embodiments, any or both of the processor 4011, the memory 4012, and the electronic peripheral interface 4013 may be implemented on an independent chip or circuit board. This is not limited in this embodiment of the present disclosure.

The radio frequency (RF) circuit 4014 is configured to receive and transmit an RF signal, which is also referred to as an electromagnetic signal. The RF circuit 4014 communicates with a communication network and other communication electronic devices through the electromagnetic signal. The RF circuit 4014 converts an electrical signal into an electromagnetic signal for transmission, or converts a received electromagnetic signal into an electrical signal. In an embodiment, the RF circuit 4014 includes: an antenna system, an RF transceiver, one or more amplifiers, a tuner, an oscillator, a digital signal processor, a codec chip set, a subscriber identity module card, and the like. The RF circuit 4014 may communicate with other electronic devices through at least one wireless communication protocol. The wireless communication protocol includes, but is not limited to: a metropolitan area network, generations of mobile communication networks (2G, 3G, 4G, and 5G), a wireless local area network, and/or a wireless fidelity (Wi-Fi) network. In some embodiments, the RF circuit 4014 may further include a circuit related to near field communication (NFC).

The touch display screen 4015 is configured to display a user interface (UI). The UI may include graphics, text, icons, videos, and any combination thereof. When the touch display screen 4015 is a touch display screen, the touch display screen 4015 is further capable of acquiring touch signals on or above a surface of the touch display screen 4015. The touch signal may be input, as a control signal, to the processor 4011 for processing. In this case, the touch display screen 4015 may be further configured to provide a virtual button and/or a virtual keyboard, which is also referred to as a soft button and/or a soft keyboard. In some embodiments, there may be one touch display screen 4015, arranged/disposed on a front panel of the electronic device 401. In some embodiments, there are at least two touch display screens 4015, arranged/disposed on different surfaces of the electronic device 401 or in a folded design. In some embodiments, the touch display screen 4015 may be a flexible display screen, arranged/disposed on a curved surface or a folded surface of the electronic device 401. Even, the touch display screen 4015 may be further set in a non-rectangular irregular pattern, namely, a special-shaped screen. The touch display screen 4015 may be made of materials such as a liquid crystal display (LCD) and an organic light-emitting diode (OLED).

A person skilled in the art may understand that a structure shown in FIG. 11 constitutes no limitation on the electronic device 401, and the electronic device may include more or fewer components than those shown in the figure, or some components may be combined, or a different component deployment may be used.

In this embodiment, the electronic device 401 further includes one or more programs. The one or more programs are stored in a memory 4012, and are configured to be executed by one or more processors 4011. The one or more programs include instructions used for performing task synchronization, communication, and driving methods and the BEOS debugging method in the in-vehicle operating system executed by the foregoing electronic device provided in the embodiments of the present disclosure.

Figure 12:
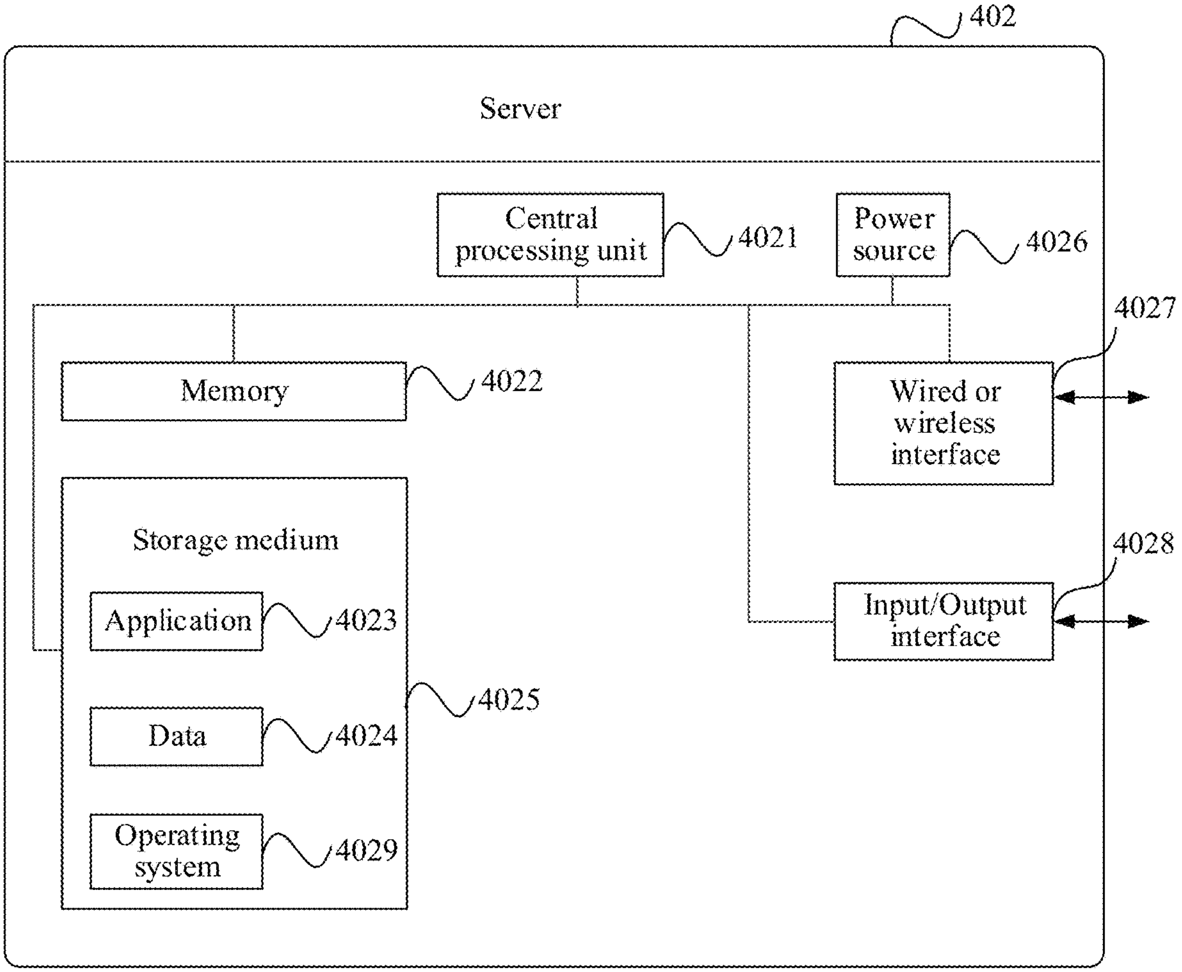
FIG. 12 is a structural block diagram of a server according to an embodiment of the present disclosure.

Based on the foregoing embodiments, this embodiment of the present disclosure provides a structural block diagram of a server. Referring to FIG. 12, the server 402 may differ a lot due to different configurations or performance, and may include one or more central processing units (CPUs) 4021 (for example, one or more processors), a memory 4022, and one or more storage media 4025 (for example, one or more mass storage electronic devices) storing an application 4023 or data 4024. The memory 4022 and the storage medium 4025 may be transient or persistent storages. The program stored in the storage medium 4025 may include one or more modules (not shown in the figure), and each module may include a series of instructions and operations for the computer system. The CPU 4021 may be configured to communicate with the storage medium 4025, and perform, on the server 402, the series of instruction operations in the storage medium 4025.

The server 402 may further include one or more power sources 4026, one or more wired or wireless network interfaces 4027, one or more input/output interfaces 4028, and/or one or more operating systems 4029, for example, Windows Server™, Mac OS X™, Unix™, Linux™ or FreeBSD™.

According to another aspect, an embodiment of the present disclosure further provides a non-transitory computer-readable storage medium for storing program code. The program code is used for performing any implementation in task synchronization, communication, and driving methods in the in-vehicle operating system and the BEOS debugging method according to the foregoing embodiments.

According to another aspect, an embodiment of the present disclosure further provides a computer program product including instructions. The computer program product, when runs on a computer, causes the computer to perform any implementation in task synchronization, communication, and driving methods in the in-vehicle operating system and the BEOS debugging method according to the foregoing embodiments.

A person skilled in the art may clearly understand that, for simple and clear description, for work processes of the foregoing described system, apparatus, and module, reference may be made to corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the module division is merely logical function division and may be other division in actual implementation. For example, multiple modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms. The modules described as separate parts may or may not be physically separate, and parts displayed as modules may or may not be physical units, may be located in one position, or may be distributed on multiple network units. Some or all the modules may be selected according to actual needs to achieve the effects of the solutions of the embodiments.

In addition, functional modules in the embodiments of the present disclosure may be integrated into one processing unit, or each of the modules may exist alone physically, or two or more modules are integrated into one module. The integrated unit may be implemented in a form of hardware, or may be implemented in a form of a software function unit. When the integrated unit is implemented in the form of a software functional unit and sold or used as an independent product, the integrated unit may be stored in a computer-readable storage medium.

Based on such an understanding, the part of the technical solutions of the present disclosure essentially contributing to the related art, or all or some of the technical solutions may be implemented in the form of a software product. The software product is stored in a storage medium and includes several instructions for instructing a computer electronic device (which may be a personal computer, a server, or a network electronic device) to perform all or some of the steps of the method described in the embodiments of the present disclosure. The foregoing storage medium includes: any medium that can store program code, such as a USB flash drive, a removable hard drive, a read-only memory (ROM), a random access memory (RAM), a magnetic disk, or an optical disc.

It should be noted that the foregoing embodiments are merely for describing the technical solutions of the present disclosure, but not for limiting the present disclosure. It should be understood by a person of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause corresponding technical solutions to depart from the spirit and scope of the technical solutions of the embodiments of the present disclosure.

What is claimed is:

1. An in-vehicle operating system, comprising a hardware layer, a software layer, and an application layer, wherein the hardware layer comprises at least one controller, and each of the at least one controller comprises a processor;

the software layer comprises a Be operating system (BEOS) and a BEOS driver, wherein the BEOS is configured to manage and control the in-vehicle operating system, and the BEOS driver is configured to transfer data between the hardware layer and the software layer; and the application layer comprises a plurality of applications, the applications are connected to the BEOS by an operating system interface, and each of the applications is configured to provide an in-vehicle application to a vehicle, wherein the operating system interface comprises a portable operating system interface (POSIX), the BEOS comprises a task layer, an intermediate protocol stack layer, and an operating system (OS) kernel layer, the task layer comprises a work task module and a system monitoring task module, and the work task module comprises at least one main task unit and at least one sub-task unit, the at least one main task unit is configured to implement a sub-task unit management, and the sub-task unit management comprises a task synchronization between sub-tasks.

2. The in-vehicle operating system according to claim 1, wherein the BEOS driver comprises at least one of: a serial port driver, a controller area network (CAN) driver, a serial peripheral interface (SPI) driver, a flash driver, an inter-integrated circuit (I2C) driver, and a real-time clock (RTC) driver.

3. The in-vehicle operating system according to claim 2, wherein the intermediate protocol stack layer comprises at least one of: a network management module, a CAN service module, and a data persistence management module.

4. The in-vehicle operating system according to claim 2, wherein the intermediate protocol stack layer further comprises at least one of: a file system module, a Transmission Control Protocol/Internet Protocol (TCP/IP) protocol module, a Bluetooth protocol stack module, and a signal management module.

5. The in-vehicle operating system according to claim 2, wherein the OS kernel layer comprises at least one of: a task management module, a task communication module, a memory management module, a memory runtime library module, a timer management module, a synchronization management module, and an interrupt management module.

6. The in-vehicle operating system according to claim 2, wherein each of the at least one main task unit is communicatively connected to the at least one sub-task unit.

7. The in-vehicle operating system according to claim 6, wherein the main task unit is configured to provide centralized resource management and the sub-task unit management, wherein the centralized resource management comprises at least one of: a timer, a message queue, a semaphore, a waiting list, and application and release of a hardware resource; and the sub-task unit management comprises at least one of: sub-task creation, sub-task deletion, sub-task state control, and sub-task state monitoring.

8. The in-vehicle operating system according to claim 6, wherein the work task module implements a task communication method comprising:

creating, by a main task, a message queue for a sub-task;

transmitting, by at least one sub-task that is to send a message, message data into the message queue; and receiving, by at least one sub-task that is to receive a message, the message data from the message queue.

9. A Be operating system (BEOS) debugging system, running on a personal computer (PC) end, and applied to an in-vehicle operating system, wherein the in-vehicle operating system comprises a hardware layer, a software layer, and an application layer applied to a vehicle, wherein the hardware layer comprises at least one controller, and each of the at least one controller comprises a processor;

the software layer comprises a BEOS and a BEOS driver, wherein the BEOS is configured to manage and control the in-vehicle operating system, and the BEOS driver is configured to transfer data between the hardware layer and the software layer; and the application layer comprises a plurality of applications, the applications are connected to the BEOS by an operating system interface, and each of the applications is configured to provide an in-vehicle application to the vehicle, wherein the operating system interface comprises a portable operating system interface (POSIX), and the BEOS comprises a task layer, an intermediate protocol stack layer, and an operating system (OS) kernel layer.

10. The BEOS debugging system according to claim 9, further comprising:

a communication protocol processing module, configured to provide communication data processing for the BEOS debugging system and the BEOS;

a source code processing module, configured to perform source code data structure analysis, source code display, and source code positioning;

a debugging element parsing module, configured to display a to-be-debugged variable; and a user operation interface module, configured to provide a user operation interface.

11. The BEOS debugging system according to claim 9, wherein the BEOS driver comprises at least one of: a serial port driver, a controller area network (CAN) driver, a serial peripheral interface (SPI) driver, a flash driver, an inter-integrated circuit (I2C) driver, and a real-time clock (RTC) driver.

12. The BEOS debugging system according to claim 11, wherein the intermediate protocol stack layer comprises at least one of: a network management module, a CAN service module, and a data persistence management module.

13. The BEOS debugging system according to claim 11, wherein the intermediate protocol stack layer further comprises at least one of: a file system module, a Transmission Control Protocol/Internet Protocol (TCP/IP) protocol module, a Bluetooth protocol stack module, and a signal management module.

14. The BEOS debugging system according to claim 11, wherein the OS kernel layer comprises at least one of: a task management module, a task communication module, a memory management module, a memory runtime library module, a timer management module, a synchronization management module, and an interrupt management module.

15. The BEOS debugging system according to claim 11, wherein the task layer comprises a work task module and a system monitoring task module, wherein the work task module comprises at least one main task unit and at least one sub-task unit, and each of the at least one main task unit is communicatively connected to the at least one sub-task unit.

16. A Be operating system (BEOS) debugging method, comprising:

sending, by a BEOS debugging system, a debugging instruction to an in-vehicle operating system, wherein the in-vehicle operating system comprises a portable operating system interface (POSIX);

debugging, by the in-vehicle operating system, on a to-be-debugged object according to the debugging instruction;

running the to-be-debugged object according to the debugging instruction, generating a running result of the to-be-debugged object, and feeding back the running result to the BEOS debugging system; and determining, by the BEOS debugging system, performance of the to-be-debugged object according to the running result of the to-be-debugged object.

17. An electronic device comprising a processor and a memory, the memory storing at least one instruction, at least one program, a code set, or an instruction set, the at least one instruction, the at least one program, the code set, or the instruction set being loaded and executed by the processor to implement the task communication method according to claim 8.

18. An electronic device comprising a processor and a memory, the memory storing at least one instruction, at least one program, a code set, or an instruction set, the at least one instruction, the at least one program, the code set, or the instruction set being loaded and executed by the processor to implement the BEOS debugging method according to claim 16.

19. A non-transitory computer-readable storage medium storing one or more programs, which when executed by one or more processors, cause the one or more processors to implement the task communication method according to claim 8.

20. A non-transitory computer-readable storage medium storing one or more programs, which when executed by one or more processors, cause the one or more processors to implement the BEOS debugging method according to claim 16.

* * * * *